Patented Dec. 8, 1953

2,662,022

UNITED STATES PATENT OFFICE 2,662,022

SELF-HARDENING WATER-GLASS COMPOSITIONS

Karl Dietz, Kronberg, Taunus, Germany, assignor to Farbwerke Hoechst Aktiengesellschaft vormals Meister Lucius und Bruning, Frankfurt am Main Höchst, Germany, a German company No Drawing. Application November 25, 1950, Serial No. 197,645

Claims priority, application Germany December 20, 1949

7 Claims. (Cl. 106—74)

The present invention relates to self-hardening water-glass compositions yielding acid-proof masses, to a process of preparing said compositions; and to means for carrying out said process.

For constructions which are to be resistant to acids, self-hardening water-glass cements are used to a large extent, their hardening being effected by salts of fluosilicic acid or analogous complex fluorine compounds contained in the cement powders. As compared with the water-glass cements, which are not self-hardening, these products offer considerable advantages in practice, especially by speeding up constructional work.

For some uses, however, the cements containing fluorine compounds are not entirely satisfactory in all cases. For instance, in the case of cement-work in contact with chrome-nickel steels or lead, the presence of fluorine compounds in the cement causes the metals and metal alloys to corrode whereby considerable deterioration may sometimes occur. In a similar way, the presence of fluorine compounds interferes with processes in which corrosive liquids are circulated and hydrofluoric acid solutions which are thereby formed, although they may be dilute, they gradually corrode the masonry built up with the use of said cements.

The present invention is based on the observation that halogen-free, self-hardening water-glass compositions yielding acid-proof masses may be obtained which do not exhibit the above disadvantages and which may be used with special advantage for the purposes mentioned above. The compositions according to the invention yield satisfactory, chemically stable cement-work especially when in contact with chrome-nickel steels or lead. The corrosion of stone material which occurs in some cases by the use of cements containing fluorine compounds is entirely avoided. Further advantages are a noteworthy impermeability to liquids, a good swelling capacity, which is useful for certain purposes, and a greatly increased power of adhesion of the cement-work to acid-proof stone material and metal, even after long exposure to stress.

Now, I have found a composition having the specified properties and containing at least one alkali water-glass solution of the group consisting of sodium silicate solutions having a ratio of $SiO_2$ to $Na_2O$ less than about 2.75 and a ratio of $SiO_2$ to $H_2O$ higher than about 0.35, and of potassium silicate solutions having a ratio of $SiO_2$ to $K_2O$ less than about 2.25 and a ratio of $SiO_2$ to $H_2O$ higher than about 0.35, an inert filler and as hardener to react with the alkali constituent of the water-glass solution, at least one member of the group consisting of esters, amides, and anhydrides of aliphatic organic acids.

The range of the alkali water-glass solutions used is limited, on the one hand, by the above mentioned ratios and, on the other hand, by their viscosity which is not higher than about 600 centipoises at 20° C. With sodium silicate solutions the ratio of $SiO_2$ to $Na_2O$ may advantageously be about 2.5 or even less, for instance about 1.72 and with potassium water-glass solutions the ratio of $SiO_2$ to $K_2O$ may be advantageously about 2.0 or even less, for instance about 1.64. The ratio of $SiO_2$ to $H_2O$ is always higher than about 0.35.

In some cases it may be of advantage to use mixtures of sodium silicate and potassium silicate solutions, the proportions of the two water-glass solutions one to the other varying within wide limits. Thus, for instance, mixtures may be used in which the ratio of the two solutions is 1:1. However, one or the other constituent may also predominate and the ratio may be a figure between about 1:2 and 2:1 or even higher.

As fillers there are used the usual inert substances, for instance quartz sand and quartz powder. Besides these substances, other silicate powders such as glass powder, porcelain powder, chamotte powder and stoneware powder may be used. In certain cases, fillers having a good thermal conductivity, such as natural or artificial graphite, for instance of the kind used for carbon electrodes, silicon carbide, silicon or the like, are advantageous. Sometimes, mixtures of different fillers also give satisfactory results.

In some cases it may be suitable to add other solid substances, as, for instance, "Kieselweiss" (active silicic acid), i. e. a silicic acid having a particularly high reactivity with alkali lyes even in the cold.

Especially suitable hardening agents are esters, such as glycol di-formate and glycerol tri-formate and also esters of polybasic acids, such as oxalic acid dimethyl ester, and esters of hydroxy acids, such as citric acid trimethyl ester, also including internal esters such as glycolide, advantageously in a polymerized form. Amides of aliphatic organic acids, such as formamide, oxamide, triacetamide and malonamide, and also anhydrides, for instance succinic anhydride, maleic anhydride or the like are also suitable for the purpose in question. The substances may be used separately. In particular cases it may also be of advantage to use as hardeners mixtures of the above mentioned substances or classes of substances, for instance mixtures of esters and amides in any proportion.

As hardeners there come into consideration especially such derivatives of aliphatic organic acids of the kind described as have an equivalent weight of at most about 60. There are mentioned for instance:

| | Equivalent weight: |
|---|---|
| Glycolide | 58 |
| Oxalic acid dimethyl ester | 59 |
| Glycol di-formate | 59 |
| Glycerol tri-formate | 58.6 |
| Formamide | 45 |
| Oxamide | 44 |
| Triacetamide | 47 |
| Malonamide | 51 |
| Succinic anhydride | 50 |
| Maleic anhydride | 49 |

The substances of this kind which are solid at ordinary temperature are best used as powders. There enter into consideration, for instance: glycolide, especially in the polymerized state, oxalic dimethyl ester, oxamide, tri-acetamide, malonamide, succinic anhydride, maleic anhydride or the like.

Liquid products of the said kind may, however, also be used, especially those boiling above 100° C. as, for instance: glycol di-formate, glycerol tri-formate, formamide or the like.

In most cases, a small quantity of a hardener is sufficient, for instance a total quantity of about 1 per cent. to about 5 per cent., calculated on the weight of the filler. In particular cases, lower or higher percentages may also be used.

In practice, such compositions have proved to be especially suitable as contain as hardener glycolide in any molecular state, for instance in the polymerized state, it being advantageous in some cases to use a filler with a good thermal conductivity such as graphite. For obtaining a special effect, part of the glycolide can be replaced by an amide of an aliphatic organic acid such as formamide. In all cases, an addition of "Kieselweiss" (active silicic acid) has proved advantageous.

The compositions according to the present invention are advantageously prepared by first mixing the ingredients mentioned above, i. e. the filler, the hardener, and the other solid substances, if any, and then cementing this mixture with an alkali water-glass solution of the above mentioned kind. For instance, one mixes glycolide, preferably in the polymerized state, and a filler, if desired with addition of formamide and/or active silicic acid and cements this mixture with an alkali water-glass solution of the above mentioned kind.

Shortly after the cementing—after about ½ hour—the composition begins to harden to an acid-proof mass. The hardening is finished after some days.

Reaction takes place, between the hardeners and the water-glass solutions of the above mentioned kind, in such a way that the alkali of the water-glass solution used is neutralized and the silicic acid thus precipitated serves as a binding agent.

The quantity of the alkali water-glass solution in proportion to the mixture comprising the filler and the hardener, depends upon the kind and quantity of the individual constituents used and may vary within wide limits. It has been found that, for instance, suitable masses are obtained by using for 100 g. of a mixture comprising a filler and a hardener, about 25 to 30 cc. of an alkali water-glass solution of the above mentioned kind. In certain cases, these values may be lower or higher.

For carrying out the process it may be of particular advantage to use a means which comprises two separately packed preparations suitable for being mixed together to produce the self-hardening composition, one preparation consisting of a powder containing the filler, the one or more aforesaid derivatives of aliphatic organic acids serving as hardener, and, if desired, another solid substance or substances, for instance active silicic acid, and the other preparation consisting of an alkali water-glass solution of the kind described.

The following examples serve to illustrate the invention but they are not intended to limit it thereto, the parts being by weight:

*Example 1*

90 parts of quartz powder of suitable fineness of grain, with a residue of 10–25 per cent on a 10,000 mesh sieve, 4 parts of clay and 2.5 parts of an active silicic acid, i. e. a silicic acid of an especially high reactivity with alkali lyes even in the cold, are mixed with 3.5 parts of glycolide. 100 g. of this cement powder are mixed with 30 cc. of a potassium silicate solution in which the ratio of $SiO_2$ to $K_2O$ is about 1.64 and that of $SiO_2$ to $H_2O$ is about 0.46. The viscosity of the water-glass solution is 80 centipoises at 20° C. After about 20 minutes, the composition begins to harden and at ordinary temperature the setting is completed after 3 days.

*Example 2*

A cement powder consisting of 92 parts of quartz powder of suitable fineness of grain and 4 parts of kaolin are mixed with 4 parts of oxalic dimethyl ester. 100 g. of this cement powder are treated with 30 cc. of a sodium silicate solution in which the ratio of $SiO_2$ to $Na_2O$ is about 1.72 and that of $SiO_2$ to $H_2O$ is about 0.43. The viscosity of the water-glass solution amounts to 450 centipoises at 20° C. After about 30 minutes, the composition begins to harden and the setting is complete after 3 days.

*Example 3*

1 part of glycolide, advantageously in the polymerized state, 3 parts of formamide, 4 parts of "Kieselweiss" (natural fine siliceous sinter), 46 parts of fine quartz sand and 46 parts of very fine quartz powder are mixed together. 100 g. of this mixture are cemented with 30 cc. of a sodium silicate solution in which the ratio of $SiO_2$ to $Na_2O$ is about 2.55 and that of $SiO_2$ to $H_2O$ is about 0.55 and which has a specific gravity of 1.48 and a viscosity of 350 centipoises at 20° C. The composition begins to harden after 30 minutes and finally yields an acid-proof mortar impermeable to liquids and having a resistance to pressure of about 300 kg./cm.$^2$.

*Example 4*

A mixture of 1 part of glycolide, which may be in a polymerized state, and 3 parts of formamide are mixed with 6 parts of "Kieselweiss" (active silicic acid) and 90 parts of a quartz powder of such a fineness of grain as is adapted to the particular requirements. 100 g. of this mixture are cemented with 25 cc. of a potassium silicate solution in which the ratio of $SiO_2$ to $K_2O$ is about 2.1 and that of $SiO_2$ to $H_2O$ is about 0.37. The viscosity of the water-glass solution amounts to 50 centipoises at 20° C. The composition begins to harden after 25 minutes. After 8 days, the hardened composition has a resistance to pressure of 250 kg./cm.²

*Example 5*

A mixture is prepared from 4 parts of succinic anhydride and 96 parts of artificial graphite, 100 g. of this mixture are cemented with 40 cc. of a sodium silicate solution in which the ratio of $SiO_2$ to $Na_2O$ is about 2.0 and that of $SiO_2$ to $H_2O$ is about 0.50. The viscosity of the sodium silicate solution amounts to 550 centipoises at 20° C. The composition obtained begins to harden after about 30 minutes and the setting is finished after about 4 days.

*Example 6*

A mixture is prepared from 1 part of glycerol triformate, 2 parts of maleic anhydride, 47 parts of natural graphite and 47 parts of very fine glass powder and 3 parts of active silicic acid, for instance "Kieselweiss." 100 g. of this mixture are cemented, shortly before use, with 22 cc. of a potassium silicate solution in which the ratio of $SiO_2$ to $K_2O$ is about 1.75 and that of $Si_2O$ to $H_2O$ is about 0.39. The potassium silicate solution has a viscosity of 60 centipoises at 20° C. After about 35 minutes, the composition begins to harden and after about 3 days the setting is complete.

I claim:

1. A self-hardening composition including a solid constituent and an aqueous water-glass constituent capable of yielding, upon hardening, a chemically-stable acid-resistant solid, wherein said solid constituent comprises an inert filler and 1-5% of glycolide, and said water-glass constituent is selected from the group which consists of sodium silicate solutions having a ratio of $SiO_2$ to $Na_2O$ less than about 2.75 and a ratio of $SiO_2$ to $H_2O$ higher than about 0.35, and potassium silicate solutions having a ratio of $SiO_2$ to $K_2O$ less than about 2.25 and a ratio of $SiO_2$ to $H_2O$ higher than about 0.35, the amount of said water-glass constituent ranging from about 25 cubic centimeters to about 30 cubic centimeters per 100 grams of solid constituent present in said composition.

2. A self-hardening composition including a solid constituent and an aqueous water-glass constituent capable of yielding, upon hardening, a chemically-stable acid-resistant solid, wherein said solid constituent comprises inert filler and 1-5% of polymerized glycolide, and said water-glass constituent is selected from the group which consists of sodium silicate solutions having a ratio of $SiO_2$ to $Na_2O$ less than about 2.75 and a ratio of $SiO_3$ to $H_2O$ higher than about 0.35, and potassium silicate solutions having a ratio of $SiO_2$ to $K_2O$ less than about 2.25 and a ratio of $SiO_2$ to $H_2O$ higher than about 0.35, the amount of said water-glass constituent ranging from about 25 cubic centimeters to about 30 cubic centimeters per 100 grams of solid constituent present in said composition.

3. A self-hardening composition including a solid constituent and an aqueous water-glass constituent capable of yielding, upon hardening, a chemically-stable acid-resistant solid, wherein said solid constituent comprises an inert filler and 1-5% of glycolide and less than 4% of formamide, the total of glycolide and formamide ranging from 1-5% of the filler, and said water-glass constituent is selected from the group which consists of sodium silicate solutions having a ratio of $SiO_2$ to $Na_2O$ less than about 2.75 and a ratio of $SiO_2$ to $H_2O$ higher than about 0.35, and potassium silicate solutions having a ratio of $SiO_2$ to $K_2O$ less than about 2.25 and a ratio of $SiO_2$ to $H_2O$ higher than about 0.35, the amount of said water-glass constituent ranging from about 25 cubic centimeters to about 30 cubic centimeters per 100 grams of solid constituent present in said composition.

4. A self-hardening composition including a solid constituent and an aqueous water-glass constituent capable of yielding, upon hardening, a chemically-stable acid-resistant solid, wherein said solid constituent comprises quartz powder and 1-5% of glycolide, and said water-glass constituent is selected from the group which consists of sodium silicate solutions having a ratio of $SiO_2$ to $Na_2O$ less than about 2.75 and a ratio of $SiO_2$ to $H_2O$ higher than about 0.35, and potassium silicate solutions having a ratio of $SiO_2$ to $K_2O$ less than about 2.25 and a ratio of $SiO_2$ to $H_2O$ higher than about 0.35, the amount of said water-glass constituent ranging from about 25 cubic centimeters to about 30 cubic centimeters per 100 grams of solid constituent present in said composition.

5. A self-hardening composition including a solid constituent and an aqueous water-glass constituent capable of yielding, upon hardening, a chemically-stable acid-resistant solid, wherein said solid constituent comprises graphite and 1-5% of glycolide, and said water-glass constituent is selected from the group which consists of sodium silicate solutions having a ratio of $SiO_2$ to $Na_2O$ less than about 2.75 and a ratio of $SiO_2$ to $H_2O$ higher than about 0.35, and potassium silicate solutions having a ratio of $SiO_2$ to $K_2O$ less than about 2.25 and a ratio of $SiO_2$ to $H_2O$ higher than about 0.35, the amount of said water-glass constituent ranging from about 25 cubic centimeters to about 30 cubic centimeters per 100 grams of solid constituent present in said composition.

6. A process for making an acid proof mass which comprises mixing an inert filler with from 1-5% of glycolide, and then cementing each 100 grams of said mixture with an amount from about 25 to about 30 cc. of at least one alkali-waterglass solution of the group consisting of sodium silicate solutions having a ratio of $SiO_2$ to $Na_2O$ less than about 2.75 and a ratio of $SiO_2$ to $H_2O$ higher than about 0.35, and of potassium silicate solutions having a ratio of $SiO_2$ to $K_2O$ less than about 2.25 and a ratio of $SiO_2$ to $H_2O$ higher than about 0.35, and allowing the mass to harden by itself.

7. A process for making an acid proof mass which comprises mixing an inert filler with from 1-5% of glycolide and less than 4% of formamide, the total of glycolide and formamide ranging from 1-5% of the filler, and then cementing each 100 grams of said mixture with an amount from about 25 to about 30 cc. of at least one alkali-waterglass solution of the group consisting of sodium silicate solutions having a ratio of $SiO_2$ to $Na_2O$ less than about 2.75 and a ratio of $SiO_2$ to $H_2O$ higher than about 0.35, and of potassium silicate solutions having a ratio of $SiO_2$ to $K_2O$ less than about 2.25 and a ratio of $SiO_2$ to $H_2O$ higher than about 0.35, and allowing the mass to harden by itself.

KARL DIETZ.

References Cited in the file of this patent

UNITED STATES PATENTS

| Number | Name | Date |
|---|---|---|
| 1,832,752 | Thoretz | Nov. 17, 1931 |
| 2,069,486 | Tilden | Feb. 2, 1937 |
| 2,206,046 | Pollard | July 2, 1940 |
| 2,492,790 | Farkas | Dec. 27, 1949 |

FOREIGN PATENTS

| Number | Country | Date |
|---|---|---|
| 108,685 | Australia | Sept. 28, 1939 |
| 108,687 | Australia | Sept. 28, 1939 |
| 723,584 | Germany | Aug. 6, 1942 |
| 256,258 | Great Britain | Mar. 10, 1927 |
| 551,408 | Great Britain | Feb. 22, 1943 |